United States Patent [19]

Hopwood

[11] Patent Number: 5,628,825

[45] Date of Patent: May 13, 1997

[54] BATTERY LUG HEATING APPARATUS

[75] Inventor: Robert T. Hopwood, Cheltenham, United Kingdom

[73] Assignee: TBS Engineering Limited, Cheltenham, United Kingdom

[21] Appl. No.: 525,523

[22] PCT Filed: Feb. 16, 1995

[86] PCT No.: PCT/GB95/00323

§ 371 Date: Sep. 19, 1995

§ 102(e) Date: Sep. 19, 1995

[87] PCT Pub. No.: WO95/22845

PCT Pub. Date: Aug. 24, 1995

[30] Foreign Application Priority Data

Feb. 18, 1994 [GB] United Kingdom ............... 9403164

[51] Int. Cl.[6] .................... B05C 11/00; B05C 13/00; B05C 13/02

[52] U.S. Cl. ................... 118/58; 118/63; 239/311

[58] Field of Search ............... 118/58, 63; 34/585, 34/638; 239/311; 366/11; 4/448; 266/251

[56] References Cited

U.S. PATENT DOCUMENTS

| | | | |
|---|---|---|---|
| 1,971,789 | 8/1934 | Lester | 34/638 |
| 3,415,220 | 12/1968 | Sabatino et al. | |
| 3,673,982 | 7/1972 | Rutledge et al. | 118/58 |
| 3,705,457 | 12/1972 | Tardoskegyi | 118/63 |
| 3,803,723 | 4/1974 | Lamm et al. | 34/585 |
| 4,157,903 | 6/1979 | Kanda et al. | 118/63 |

FOREIGN PATENT DOCUMENTS

| | | | |
|---|---|---|---|
| 1159052 | 12/1963 | Germany. | |
| 497941 | 12/1938 | United Kingdom | 118/58 |
| 1351354 | 4/1974 | United Kingdom. | |
| WO88/02930 | 4/1988 | WIPO. | |

*Primary Examiner*—Donald E. Czaja
*Assistant Examiner*—Michael Philip Colaianni
*Attorney, Agent, or Firm*—Young & Thompson

[57] ABSTRACT

This invention relates to apparatus for heating the lugs of battery plates. The apparatus 10 includes a hot air duct 11 which communicates with a nozzle 12 having a head 13 that defines a pair of opposite facing nozzles 14. Each nozzle 14 has an outlet 15 from which extends a generally flat and divergent plate 16. The plate 16 entrains hot air passing through the outlet 15 into a generally flat stream so that the hot air impinges on lugs 19, but not of the rest of the group 18 of plates and separators.

9 Claims, 1 Drawing Sheet

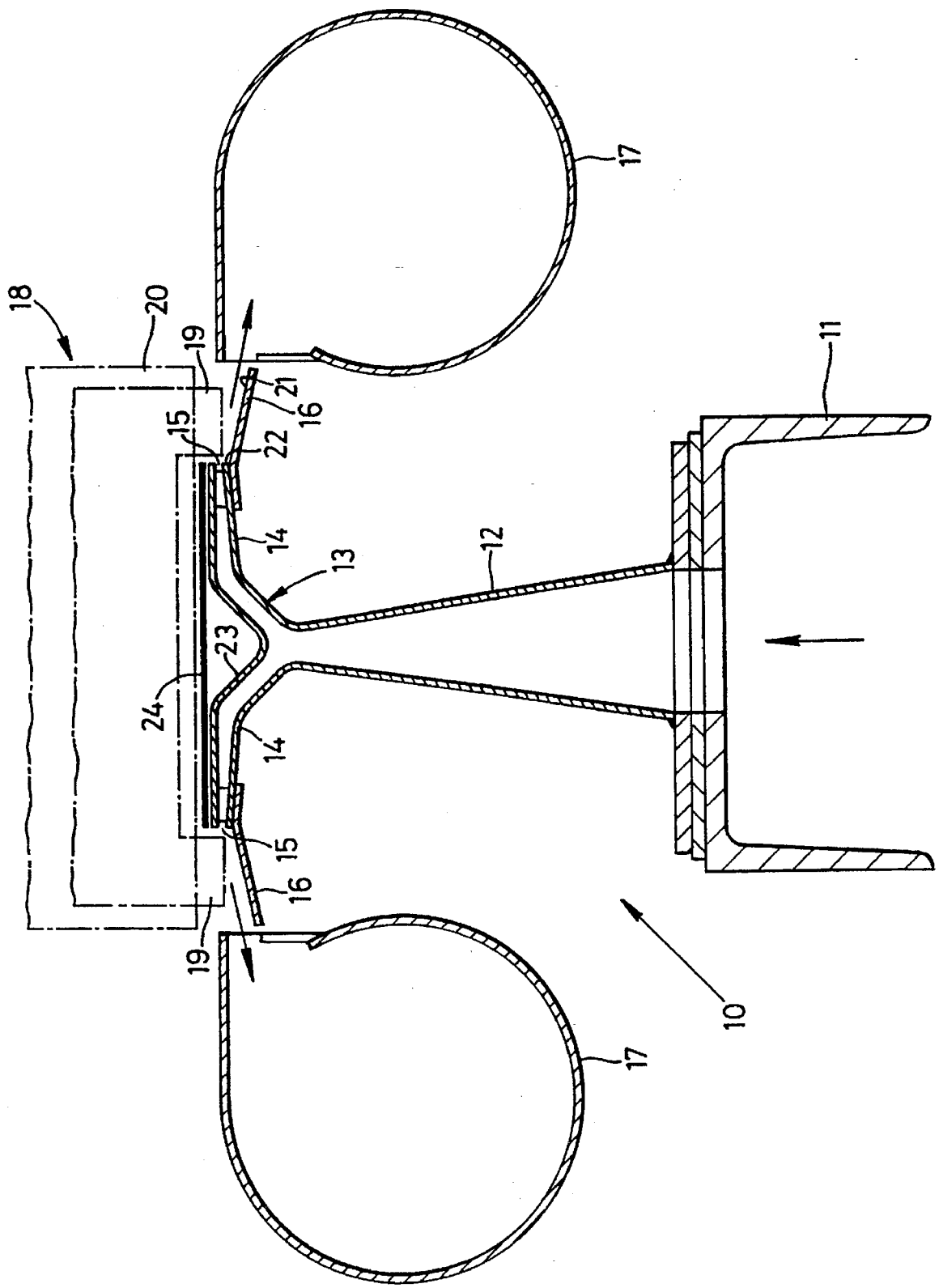

BATTERY LUG HEATING APPARATUS

FIELD OF THE INVENTION

This invention relates to an apparatus for heating the lugs of battery plates and in particular, but not exclusively, to an apparatus for carrying out this heating step when the plates are arranged in groups prior to having straps cast on them.

BACKGROUND OF THE INVENTION

It is known that, particularly when certain fluxes are used, the porosity of the joint between a battery lug and its cast-on strap can be considerably reduced if the temperature of the lug is raised significantly and preferably to over 150° C. The heating normally takes place using hot air and the air temperature is typically 350°–400° C. For the most part this method has been limited to certain specialized batteries, such as computer stand-by batteries, because the hot air from the nozzle tends to degrade the separators which are used between the plates in most common form of batteries, e.g. automotive or truck batteries.

Where the separators are individual sheets between the plates at least one manufacturer has attempted to push physically the separators away from the hot air stream but without any significant success. Such an approach is in any case impractical when, as is quite common, the separators are in the form of an envelope in which the battery plates sit.

SUMMARY OF THE INVENTION

From one aspect the invention consists of an apparatus for heating a lug of a battery plate, including means for defining a treatment position for the plate with its lug projecting into a lug position, a nozzle connectable to a source of hot gas and having an outlet directed at the lug position, and means defining a surface extending from the outlet and diverging from the direction of the outlet away from the treatment position where hot gas passing through the nozzle will have been entrained into a gas stream passing through the lug position and along the surface.

In a preferred embodiment the surface defining means comprise a generally flat plate and it is particularly preferred that there is a step between the outlet and the surface to define partially the lug position.

In most cases it will be convenient to use the apparatus with an assembled group of plates and separators in which case the outlet and the surface may extend at least substantially along the width of the group. There may be a pair of oppositely facing nozzles and surface defining assemblies; one for each set of lugs on the group.

The treatment position defining means may include a guard for preventing contact between the groups and the nozzle, in which case the lugs may project through openings in the guard.

Although the invention has been defined above, it is to be understood that it includes any inventive combination of the features set out above or in the following description.

BRIEF DESCRIPTION OF THE DRAWING

The invention may be performed in various ways and a specific embodiment will now be described, by way of example, with reference to the accompanying drawing.

The FIGURE is a schematic cross-sectional view of a double nozzle with battery group shown in outline.

DESCRIPTION OF THE PREFERRED EMBODIMENT

Lug heating apparatus is generally indicated at 10 and includes a hot air duct 11 which communicates with a nozzle 12 having a head 13 generally in the form of a pair of wings. Each wing 14 defines a nozzle outlet 15 from which extends a generally flat and divergent plate 16, which extends to the inlet of an exhaust duct 17.

As can be seen in the FIGURE, when an inverted and gripped battery group 18 is positioned over the nozzle 12 its lugs 19 lie immediately adjacent respective outlets 15 of the head 13. The hot air passing out of the outlet 15 heats the lugs 19 to the desired temperature.

However, in the absence of the plates 16 the hot air would extend in a diverging stream which would impinge on the separators 20 and, if they are in envelope form, actually enter inside the envelopes 20. This would cause immediate degradation of the separator material and almost inevitably lead to short-circuits within the battery.

Surprisingly this substantial problem is solved by the presence of plates 16 which have the effect of entraining the air into a stream which passes essentially along the surface 21 of the plates 16 so that only the lugs 19 are heated. This effect can be enhanced by a step 22 being provided between the outlet 15 and the surface 21 which enables the lug to be inserted firmly into this stream.

The exact reason for creating the stream is not known for certain. But it is believed that when air exits the nozzle and impinges on the plate it is guided into a fast flowing layer which results in a localised low pressure region which then entrains the rest of the hot air, increasing the effect. The layer is essentially held there by the surrounding atmospheric pressure. This simple but very surprising solution enables a very precisely controlled air stream to be created at whatever location is required for a particular plate geometry. It has been determined that if the nozzle outlet is too high, the air stream becomes too broad for it to be effectively entrained, but the actual dimension depends on the air velocities and temperatures being used. Simple experimentation will determine the appropriate dimension, but for the Applicants' set-up nozzle outlet heights of between 1 mm–3 mm are acceptable and 2 mm is particularly preferred.

It will be appreciated that the upper surface 23 of the head 13 is extremely hot and if the separators are not trimmed accurately there is a danger that they might impinge on that head. For this reason a spring-loaded plate 24 can be provided to act as a guard to prevent such contact taking place. The plate will be formed to allow the lugs 19 to project beyond it.

In certain uses at least, it may be desirable to achieve close temperature control on a nozzle-by-nozzle basis. In that case cold air may be blown into a manifold containing individual heaters for each nozzle and the manifold may be connected by individual tubes passing through the duct 11 which then simply acts as a support.

I claim:

1. An apparatus for heating a lug of a battery plate, said apparatus comprising:

means for defining a treatment position for said plate with said lug projecting into a lug position, a nozzle connectable to a source of hot gas and having an outlet directed at said lug position, and means for defining a surface extending from said outlet and diverging from a direction of said outlet away from said treatment position, whereby hot gas passing through said nozzle will be entrained into a gas stream passing through said lug position and along said surface.

2. An apparatus as claimed in claim 1, wherein said surface defining means comprise a generally flat plate.

3. An apparatus as claimed in claim 1, further comprising a step between said outlet and said surface to define partially said lug position.

4. An apparatus as claimed in claim 1 for heating a plurality of lugs of respective battery plates having interspersed separators arranged in a group, said outlet and said surface extending at least substantially along a width of said group.

5. An apparatus as claimed in claim 4, having a pair of nozzle and surface defining means for each plurality of lugs of said group.

6. An apparatus as claimed in claim 4, wherein the treatment position defining means includes a guard for preventing contact between the groups and the nozzle.

7. An apparatus as claimed in claim 6, wherein the guard is formed by a plate having openings through which lugs can project.

8. An apparatus as claimed in claim 1, wherein the nozzle outlet has a height of between 1 mm to 3 mm above said surface defining means.

9. An apparatus as claimed in claim 8, wherein the nozzle outlet has a height of 2 mm above said surface defining means.

* * * * *